United States Patent [19]

Bargeron et al.

[11] 4,148,585
[45] Apr. 10, 1979

[54] THREE DIMENSIONAL LASER DOPPLER VELOCIMETER

[75] Inventors: C. Brent Bargeron, Columbia; Owen J. Deters, Silver Spring, both of Md.

[73] Assignee: The United States of America as represented by the Department of Health, Education & Welfare, Washington, D.C.

[21] Appl. No.: 767,883

[22] Filed: Feb. 11, 1977

[51] Int. Cl.$^2$ .............................................. G01P 3/36
[52] U.S. Cl. ................................................ 356/28.5
[58] Field of Search ....................... 356/28, 106 R, 111

[56] References Cited

U.S. PATENT DOCUMENTS

| | | | |
|---|---|---|---|
| 3,723,004 | 3/1973 | Brayton | 356/28 |
| 3,730,625 | 5/1973 | Brayton | 356/28 |
| 3,744,910 | 7/1973 | Deelen | 356/111 |
| 3,860,342 | 1/1975 | Orloff et al. | 356/28 |
| 3,915,572 | 10/1975 | Orloff | 356/28 |
| 3,930,734 | 1/1976 | Holly et al. | 356/28 |

FOREIGN PATENT DOCUMENTS 2430664  1/1976  Fed. Rep. of Germany ............. 356/28

OTHER PUBLICATIONS

Oldengarm et al.; Journal of Physics E; vol. 9, No. 11, pp. 1009–1012, Nov. 1976.
Bossel et al.; Journal of Physics E; vol. 5, No. 9, Sep. 1972.
J. Oldengarm et al.; Optics and Laser Technology, 12/1973, vol. 5, No. 6, p. 249.
E. B. Denison et al.; Rev. Sci. Instr., 41, 1475–1478 (1970).
J. Oldengarm; Nato Advisory Group for Aerospace Research and Development, AGARD-CP-193, Ref. 22, 9/1976.
F. F. Mark et al.; Proc. 1975 Biomech. Symp., AMD-vol. 10, Troy, NY; Jun. 1975.
W. H. Stevenson; Applied Optics, vol. 9, No. 3, p. 649, 3/1970.

*Primary Examiner*—S. C. Buczinski
*Attorney, Agent, or Firm*—Browdy and Neimark

[57] ABSTRACT

A laser Doppler velocimeter which can measure fluid flow in three dimensions, employing a laser beam projected through a rotating diffraction grating and spaced lenses, with a beam splitter in the major optical path between two lenses ahead of the flow channel through which the fluid passes. Selected pairs of laser-derived beams are directed through the fluid and intersect at a predetermined point in the fluid. The movement of the particles through interference patterns formed by the intersecting laser-derived beams generates further-modulated scattered light, which is focused on a photomultiplier tube, from the output of which a fluid velocity directional component signal is derived for each pair. There are four laser-divided beams, and different pairs of these beams can be selected, to provide measurements from which the components of the fluid velocity along three mutually orthogonal directions can be derived.

10 Claims, 5 Drawing Figures

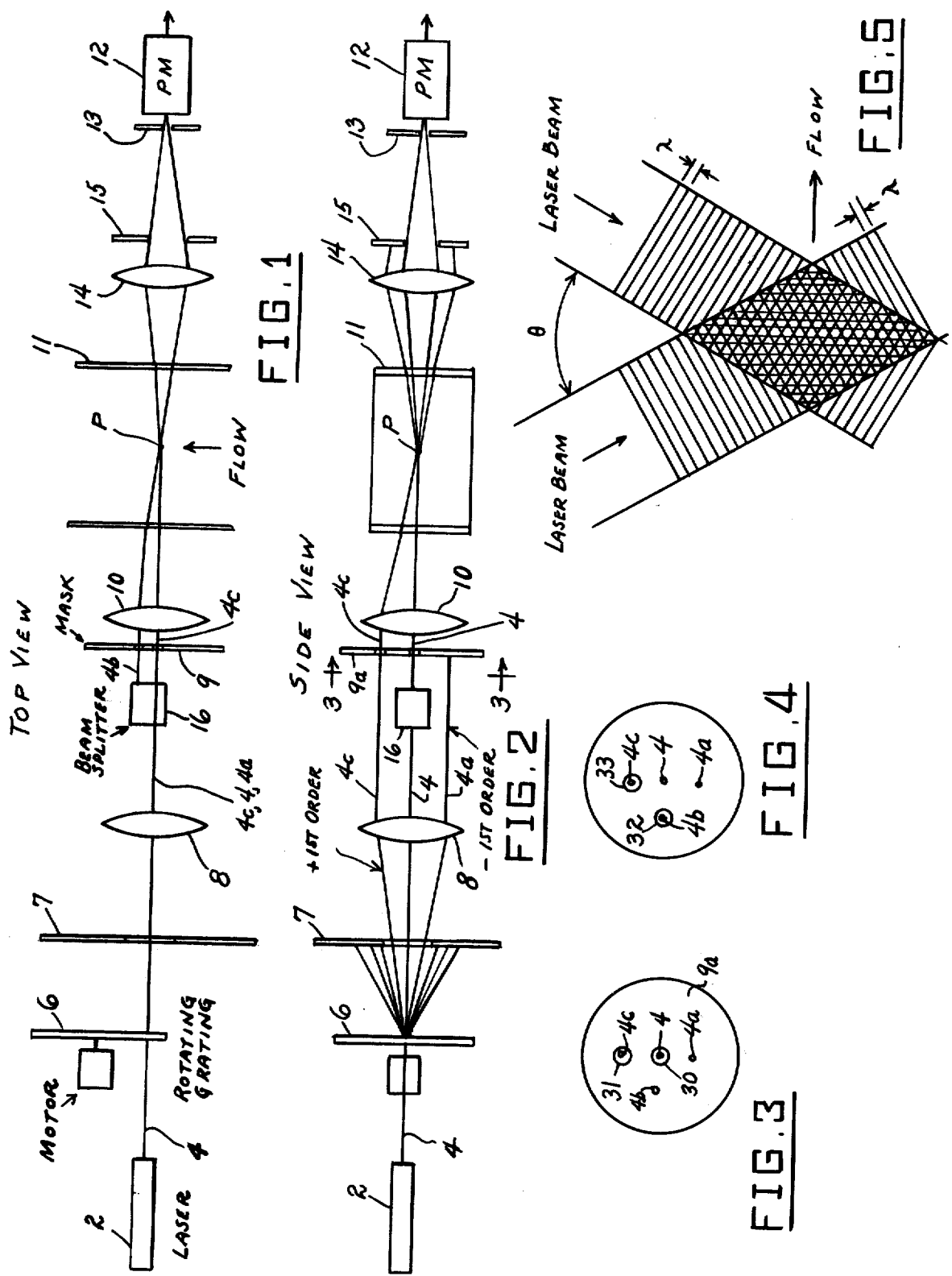

THREE DIMENSIONAL LASER DOPPLER VELOCIMETER

FIELD OF THE INVENTION

This invention relates to laser Doppler velocimeters for measuring fluid flow, and more particularly to laser Doppler velocimeters of the crossed beam type wherein coherent laser beams are caused to intersect at a predetermined point of interest in the flow field and wherein the beams produce a fringe pattern at the point of intersection.

BACKGROUND OF THE INVENTION

The art of measuring fluid flow, either liquid or gas, is now relatively sophisticated and employs comparatively complex instruments. In solving aerodynamic problems wherein wind tunnels are utilized, it is frequently important to determine the speed of fluid flowing at specific selected points in the flow channel. Flows immediately adjacent to a vehicle model under test may be measured by utilizing pressure pickups mounted flush in the model surface at the desired location and comparing the sensed pressure with the known dynamic pressure of the free stream flow. For other preselected points, devices which have previously been utilized include pitot tubes, vanes, hot wire anemometers, heat flux transducers, and the like. These devices have serious disadvantages in that they must be physically located in the flow at the point where measurement is desired, and consequently distort the local flow and change the true velocity. Secondly, the devices are subject to adverse environmental factors such as excessive pressures and temperatures and may suffer damages therefrom.

With the development of lasers, providing sources of highly coherent light, velocity measurement in a flow field has become possible without affecting or disturbing the flow field. The main principle which underlies the operation of a laser velocimeter is that the wave length of light scattered from a moving object is modified by the motion of that object and the frequency of the light is shifted in a manner equivalent to the Doppler effect. Particles in the flowing fluid will scatter the light beam as they move across the focal point of a lens illuminated by the light beam. The particles must be such that they are suspended in the field and move at the same velocity as and in the same direction as the fluid flow.

A typical laser velocimeter based on this principle focuses an unscattered coherent reference light beam and the scattered light on a photomultiplier tube, and the non-linear action of the photomultiplier tube causes a heterodyning action which produces an electrical output whose frequency is the difference between the frequencies of the two light sources. This frequency shift is directly proportional to the velocity of the suspended particles, and its detection is suitably processed electronically to produce an electrical signal which is converted into a velocity display, such as a periodic wave on an oscilloscope, a side band on a spectrum analyzer, or converted into an electrical signal directly proportional to the velocity. This type of laser velocimeter is generally referred to as a "reference beam" velocimeter.

An improvement in this technique permits measurements to be made in three dimensions by providing three independent receiving systems that are all focused from different directions on the same scattering volume illuminated by the coherent beams. Each of the Doppler-shifted, or scattered beams is coherently mixed with a portion of the reference beam which has not been Doppler-shifted to obtain the velocity in three dimensions, which thereby permits determination of the velocity vector. It is to be noted that in these reference beam systems, the Doppler shift measured is a function of the direction of light collection.

Another known method of fluid velocity detection, generally referred to as utilizing a "crossed beam" (differential mode) velocimeter, employs two unscattered coherent laser beams which are caused to intersect at a predetermined point of interest in the flow field, whereupon the two beams produce a fringe pattern at this point of intersection. A particle passing through this fringe pattern will produce a periodic variation in the amount of light scattered as it passes through the light and dark crests of the fringe pattern. Particles passing through the intersection of crossed laser beams produce a Doppler difference frequency which is independent of the viewing direction.

From the above it is apparent that laser velocimeters provide a means of measuring fluid velocity without the necessity of inserting probes into the flow field. Such velocimeters are limited however to reading the local velocity in a finite area, i.e., the focal point of the reference beam velocimeter optics, or the point of intersection of the crossed beam velocimeter. To move this point requires precision adjustments of the laser beams and/or the receiving optics, which are time-consuming and which requires much testing. The magnitude of this problem will be appreciated if one understands that the unfocused laser beams are approximately 1 to 2 millimeters in diameter, The precision alignment of these beams so that they illuminate the desired finite area or cross at the desired point is quite difficult, and once alignment is obtained, the alignment may be lost by any change in the refraction index of the flow field medium, such as changes in density of the flow medium, such as those caused by the development of shock waves in the medium.

Another condition which complicates beam alignment is encountered whenever it is desired to move the beam to a new area of interest (the focal point of a reference beam velocimeter or the intersection point of a crossed beam velocimeter), since any change in the angle of incidence of the beams with the tunnel window or with the flow medium will change the beam refraction.

Further background will be given by examining the following U.S. prior patents, which appear to represent the closest prior art relating to the present invention, found in the course of a preliminary search:

U.S. Pat. No. 3,532,427—Paine
U.S. Pat. No. 3,623,361—Funk
U.S. Pat. No. 3,809,480—Somerville
U.S. Pat. No. 3,825,346—Rizzo
U.S. Pat. No. 3,915,572—Orloff
U.S. Pat. No. 3,856,403—Maughmer
U.S. Pat. No. 3,966,324—Iten

SUMMARY OF THE INVENTION

The basic principle of the laser Doppler velocimeter of the present invention lies in the utilization of the system of fringes developed at the intersection of two coherent light beams. When a particle in the fluid passes through this intersection, it scatters light as it crosses each bright fringe. This scattered light is thus periodic and its frequency depends on the number of fringes crossed per unit of time. The speed v of the particle is then determined as the frequency f times the distance d between fringes.

This is expressed as:

$$v = f \times d = \frac{f\lambda}{2 \sin(\theta/2)}$$

where $\theta$ is the angle between the intersecting beams and $\lambda$ is the wavelength of the light. By measuring the frequency of the scattered light, the velocity component perpendicular to the fringe is determined. It should be noted that a particle moving in the opposite direction at speed v will also scatter light at the identical frequency; hence, only the magnitude of the velocity and not the direction is determined.

To determine the direction of the particle, the frequencies of the light in the two intersecting beams are made unequal. This change causes the fringe pattern to propagate in a direction perpendicular to the fringes. Thus, a particle at rest in the fluid will scatter light at a frequency $F_o$ depending on the velocity at which the fringes propagate. When a particle crosses the fringe pattern in the direction in which the fringes are propagating it will cross fewer fringes per unit time than if it were at rest, hence the frequency of scattered light will be less than $F_o$. Conversely, when a particle crosses the fringe pattern in a direction opposite to the direction of propagation, it will cross a greater number of fringes per unit time, and hence the frequency of scattered light will be greater than $f_o$. Thus, the frequency of the scattered light will define both the magnitude and direction of the scattering particle's velocity.

Accordingly, a main object of the present invention is to provide a novel and improved substantially self-aligning laser Doppler velocimeter of the crossed beam type which measures both magnitude and direction of the fluid flow.

A broad object is to provide for improved fluid flow measurement.

A further object of the present invention is to provide an improved laser Doppler veloimeter wherein a laser beam source provides a beam which passes through a rotating diffraction grating to provide a number of beams of different frequencies and wherein pairs of these beams are employed to form fringe patterns at their intersection, whereby the speed of a fluid-carried particle at said intersection can be measured by measuring the frequency of light pulsations propagated by the particle at the fringe patterns, the optical arrangement being substantially self-aligning, and whereby the need for precise adjustments of the elements of the system is substantially reduced as compared with previously employed systems of a corresponding type.

A still further object of the invention is to provide an improved laser Doppler velocimeter of the crossed beam type wherein the analysis of fluid velocity may be made at various points without the necessity of realigning the component optical beams or changing lenses, and wherein measurements can be easily used to derive components in three mutually orthogonal directions.

A still further object of the invention is to provide an improved laser Doppler velocimeter of the crossed beam type wherein a simple and inexpensive rotating diffraction grating may be employed instead of a Bragg cell or Pockel cell, thereby reducing the need for expensive equipment, wherein the lenses of the associated optical system are in a substantially self-aligning arrangement, and wherein it is feasible to evaluate fluid velocity in three dimensions.

BRIEF DESCRIPTION OF THE DRAWINGS

Further objects and advantages of the invention will become apparent from the following description and claims, and from the accompanying drawings of embodiments of the invention, wherein:

FIG. 1 is a diagrammatic top plan view of an improved laser Doppler velocimeter system according to the present invention arranged for the measurement of fluid velocity components.

FIG. 2 is a diagrammatic side view of a laser Doppler velocimeter system similar to that of FIG. 1 but using a beam mask apertured for the measurement of a fluid velocity component in the vertical plane of flow.

FIG. 3 is a transverse vertical cross-sectional view taken substantially on the line 3—3 of FIG. 2.

FIG. 4 is a transverse vertical cross-sectional view similar to FIG. 3 but wherein the system utilizes a beam mask apertured for measurements from which a velocity component in a direction perpendicular to the vertical plane of flow can be derived.

FIG. 5 is an enlarged diagram showing a pair of intersecting laser beams as employed in a velocimeter according to the present invention and illustrating the interference pattern formed by the intersecting beams and the resultant light scattering directionality.

DESCRIPTION OF A PREFERRED EMBODIMENT

Referring to the drawings, FIG. 1 schematically shows a working instrument constructed in accordance with the principles of the present invention. A laser 2 emits a beam 4 which passes through a rotating diffraction grating 6. The diffraction grating 6 converts the beam 4 into a number of beams having different frequencies, including the center laser beam frequency and others increased and decreased relative to the center beam frequency by equal increments, the center beam frequency remaining unchanged. A mask 7 is mounted in the path of the beams emerging from the rotating grating 6, said mask having an aperture suitably dimensioned to block all diffracted beams except the center beam 4 and the first order diffracted beams 4a and 4c, which are made parallel to center beam 4 by passing through a lens 8. The center beam then passes through a conventional beam splitter 16, which splits the beam in two, thereby providing an additional beam 4b of the same frequency as and travelling parallel to center beam 4, making a total of four beams, namely, 4, 4a, 4b and 4c.

Analysis of fluid velocity at various points P may be accomplished by moving the optical system rigidly with respect to the flow model channel 11, without the necessity of realigning the beams or changing lenses. For example, the optical system may be mounted on a precision-machined table with 3 translational and 1 rotational degrees of freedom.

Respective pairs of interfering beams, intersecting at point P, each forms a fringe pattern similar to that shown in FIG. 5, and particles carried by the moving fluid scatter the light of the bright bands of the fringes in a periodic manner as the particles move through the patterns. The pattern-modulated scattered light from the point P is focused by a lens 14 onto the cathode of a photomultiplier tube 12 via a small-apertured gate 13 located close to said cathode. An iris 15 is used to block the unscattered light in any pair of the original beams 4, 4a, 4b or 4c. The light reaching the /photomultiplier tube 12 is periodic, and the frequency of the intensity-modulated light is easily measured by conventional techniques, such as spectrum analysis or correlation analysis, applied to the output of the photomultiplier tube.

FIG. 3 shows the spatial arrangements of the four parallel beams 4, 4a, 4b, 4c as they reach the beam mask, shown at 9a. The three beams 4, 4a, and 4c can be selected in pairs by blocking the remaining beams using masks as is shown in FIG. 3. Combining the measurements from any two of the three pairs, the two orthogonal components of velocity in the vertical plane can be derived. Similarly, using a mask as shown in FIG. 4 and selecting either pair 4b and 4c or 4b and 4a and then combining these measurements with the orthogonal velocity components in the vertical plane the three mutually orthogonal velocity components can be derived. The masks are mechanically interchangeable; suitable supporting means may be provided to permit convenient changing of the masks.

The rotating grating 6 provides a frequency bias sufficient to avoid frequencies near zero, thus preventing errors due to rectification of velocities.* More importantly, it provides a unified source of all the necessary intersecting beams, without requiring the use of a Bragg cell or a Pockel cell and their associated complex high frequency electronic equipment. The use of said rotating grating 6 allows the associated lenses to be positioned in a coaxial, substantially self-aligning arrangement. Also, the system allows easy evaluation of fluid velocity in three dimensions.

*See the discussion in U.S. Pat. No. 3,856,403.

The rotating grating 6, in a typical embodiment, is driven at a speed of the order of 60 RPM and has about 12000 lines around the circumference.

While certain specific embodiments of an improved laser Doppler velocimeter have been disclosed in the foregoing description, it will be understood that various modifications within the scope of the invention may occur to those skilled in the art.

For example, by incorporating a second diffraction grating and creating four beams having frequency differences (from among the six pair-wise combinations which are adequately separated), continuous an simultaneous measurements can be made. From these measurements a continuous record of three mutually orthogonal components can then be derived for time dependent fluid flow fields.

Therefore, it is intended that adaptations and modifications should and are intended to be comprehended within the meaning and range of equivalents of the disclosed embodiments.

What is claimed is:

1. Apparatus for measuring velocities of fluid flow within a flow channel comprising source means for generating a main beam of coherent monochromatic radiation, diffraction grating means for converting said main beam into a center beam and diffracted beams differing in frequency from said center beam, means for splitting said center beam so as to derive a plurality of resultant beams of the same frequency as said main beam, means to project said resultant beams and said diffracted beams so as to intersect at a predetermined point in said flow channel and form interference fringes for scattering light in accordance with velocity of fluid flow in said flow channel, and photosensitive means for collecting the scattered light from said interference fringes and for generating electrical signals representing fluid velocity components.

2. The velocity measuring apparatus of claim 1, and wherein said splitting means forms two resultant beams in spaced parallel relationship.

3. The velocity measuring apparatus of claim 1, and wherein said diffraction grating means comprises a rotating diffraction grating through which said main beam passes.

4. The velocity measuring apparatus of claim 1, and means to limit said diffracted beams to two first order diffracted beams with frequencies respectively above and below that of said center beam.

5. The velocity measuring apparatus of claim 1, and means to limit the beams projected toward said predetermined point to a pair of beams selected from said resultant beams and said diffracted beams.

6. The velocity measuring apparatus of claim 5, and wherein said limiting means comprises a mask mounted in the path of said resultant beams and said diffracted beams and having respective apertures for each of the beams in said pair of beams.

7. The velocity measuring apparatus of claim 1, and wherein a lens is provided in the path of said center beam and diffracted beams to make said diffracted beams parallel to said center beam.

8. The velocity measuring apparatus of claim 7, and wherein said projecting means comprises a lens focusing said resultant and diffracted beams through said predetermined point in the flow channel.

9. The velocity measuring apparatus of claim 1, and iris means between said flow channel and said photosensitive means formed to block the unscattered light of said resultant beams and diffracted beams.

10. The velocity measuring apparatus of claim 1, and wherein said source means, said diffraction grating means, said beam splitting means, said projecting means, and said photosensitive means are located on a common optical axis containing said predetermined point in the flow channel.

* * * * *